United States Patent [19]

Motoki

[11] Patent Number: 4,956,013

[45] Date of Patent: Sep. 11, 1990

[54] REFRACTORY COATING COMPOSITION

[75] Inventor: Hideo Motoki, Ibaraki, Japan

[73] Assignee: Shikoku Kaken Kogyo Co., Ltd., Ibaraki, Japan

[21] Appl. No.: 221,830

[22] PCT Filed: Oct. 7, 1987

[86] PCT No.: PCT/JP87/00755
§ 371 Date: Jun. 7, 1988
§ 102(e) Date: Jun. 7, 1988

[87] PCT Pub. No.: WO88/02740
PCT Pub. Date: Apr. 21, 1988

[30] Foreign Application Priority Data

Oct. 7, 1986 [JP] Japan ............................ 61-238703

[51] Int. Cl.$^5$ .................. C04B 7/02; C04B 14/18; C04B 14/20; C04B 24/00
[52] U.S. Cl. ................... 106/675; 106/696; 106/708; 106/719; 106/DIG. 2; 106/790; 524/5
[58] Field of Search ............... 106/97, DIG. 2, 90

[56] References Cited

U.S. PATENT DOCUMENTS 4,174,230  11/1979  Hashimoto et al. ............... 106/111
4,544,409  10/1985  Daussan et al. .................. 106/99

FOREIGN PATENT DOCUMENTS 52-000933  1/1977  Japan .
57-010065  2/1982  Japan .
57-048507  10/1982  Japan .

Primary Examiner—Mark L. Bell
Assistant Examiner—Anthony J. Green
Attorney, Agent, or Firm—Armstrong, Nikaido, Marmelstein, Kubovcik & Murray

[57] ABSTRACT

The present invention provides a refractory coating composition comprising:
(i) 100 parts by weight of a hydraulic cement,
(ii) 3 to 50 parts by weight of a re-emulsion type powdery resin,
(iii) 50 to 600 parts by weight of a mixture of 15 to 85% by weight of aluminum hydroxide powder and 85 to 15% by weight of carbonate decomposable at a temperature of 300° to 1000° C., and
(iv) 20 to 300 parts by weight of a lightweight aggregate having open cells at a ratio of at least 50% based on the total cells.

5 Claims, 5 Drawing Sheets

REFRACTORY COATING COMPOSITION

FIELD OF THE INVENTION

This invention relates to refractory coating tstanding in fire resistance and to compositions ou refractory coating methods.

Prior Art and Problems

Refractory coating compositions useful in constructing buildings of steel frame structure, plants or the like are required to have specific fire resistance. For example, the Ministry of Construction set a standard of fire resistance required in refractory structures. A method for fire resistance test is specifically defined in "Specified method for fire-resistant structures" in Notification No. 2999 (May 31, 1969) of Ministry of Construction. The testing conditions shown in the notification include, for example, the requirements for steel columns to be tested that the coated steel columns shall be heated in a furnace at about 1000° C. for predetermined time, e.g., 1 hour in a 1-hour fire resistance test. and that the temperature of the steel frame shall not exceed 350° C. on the average. A variety of refractory coating compositions including those for spraying and those to be made into boards have been heretofore accredited as meeting the requirements.

From the standpoint of architectural design, there is a demand for refractory coating materials giving more lightweight, thinner coats on steel frames. More specifically, the decrease in the weight of coating material per unit area of coating mitigates the weight load to be supported by a steel structural member of a building and thus may lead to use of smaller-size steel structural members if the conditions otherwise permit. Particularly this effect is larger with an increase in the height of a high-rise building. On the other hand, if a refractory coating material can be applied thinner, the coating operation can be completed in a shorter period of time because of reduced coat thickness. The application of thinner coating provides further great advantages of decreasing the volume of coating material used, reducing the space for storage and lessening the transportation amount. Moreover, a thinner coating gives another advantage in terms of use in that the effective volume of defined space which can be utilized is increased as a function of the reduction of coat thickness.

The refractory coating methods are roughly classified into two methods. One of them is called a dry method which comprises adhering to a steel frame, boards of calcium silicate, gypsum boards, asbestos cement slates or the like. The other method is a wet method which comprises coating a steel frame with a mixture of coating material and water by spraying, troweling or concreteplacing or other means on a building site.

The dry method is to stick dried boards to a steel frame on a building site, eliminating the need for an in-situ drying procedure, unlike the wet method involving the use of water, and thus the builder can advantageously proceed to subsequent operation on completion of the procedure. With a smooth surface, dry boards can provide a surface to be decorated. However, the dry method has the drawbacks of involving cumbersome labors such as cutting the dry board in conformity with various shapes of substrate, fixing a joint between the boards in a complicated connection which tend to form gaps, and repairing the damaged portions of boards which are generally prone to break and crack.

Moreover, the dry method is time-consuming in lifting boards to a higher position on a building site in contrast to the wet method which is capable of pumping up the coating material relatively easily to higher locations.

For covering steel beams or columns of relatively intricate shape, the wet method, particularly spraying method, is employed because of ease of operation instead of the dry method with the above-noted drawbacks.

Given below are known refractory coating materials to be chiefly used in the wet refractory coating method.

(1) Mortar concrete type

A formwork is set around a steel member and then concrete, lightweight concrete, cellular concrete or the like, is placed into a space between the formwork and the steel member. Alternatively mortar or lightweight mortar is applied with a trowel onto a lath base affixed to the steel member. The cured coat of these materials acts as a refractory material, utilizing the property of retarding the transfer of heat to the steel members due to its large thermal capacity to an extent corresponding to the amount of externally applied heat consumed in heating the coating material.

In this case, for example the coat requires a 30 mm or 40 mm thickness to achieve fire resistance for 1 hour, and is heavy in terms of the weight per unit area.

(2) Asbestos, rock wool type spray coating materials

Asbestos, rock wool or like flocculent materials containing a large amount of fine air serve to retard the transfer of heat due to their heat insulation properties. These materials are more lightweight than the materials described above in (1) but are applied thickly because the coat formed needs a thickness of about 30 mm to achieve 1-hour fire resistance.

Particularly the coats formed from most of these materials are extremely low in strength and adhesion and thus are likely to peel, drop or break when externally contacted, shaken or exposed to moisture condensation. To preclude this tendency, a wire netting is fixed to a substrate but without a satisfactory result. Since asbestos is a substance causing "asbestos pollution" which has currently surfaced as a social problem, the use thereof has the serious defect of injuring inhabitants' health.

Depending on the coating method, a mixture of inorganic powders such as asbestos, rock wool, cement and the like may be supplied through a hose as dispersed in air under pressure to the forward end of the hose to get mixed with water. Yet these powders, insufficiently mixed with water, may be strewn and throw dust into the atmosphere, causing the likelihood of significantly smearing the work environment.

These fibrous materials with their characteristics give coats with a surface which is easy to soil by dirt or the like deposited thereon. Further, the defiled coat, if washed with water or the like, would be likely to separate owing to its low strength and adhesion and would be inevitably left defiled.

Vermiculite materials, as well as the materials stated above in (1) and (2), are usable but have the shortcomings of involving great coat thickness as in the refractory coating materials (2) and tending to form, because of poor strength, coats which readily peel, separate or break.

Recently building constructors and their clients are increasingly making strong demands for simplification of the building process and accelerated completion of construction. In view of the same, improvements have been demanded in refractory coating operations, so that term of works on a building site can be made as short as possible. As a solution to this problem, a method has been proposed in which steel members coated with fire-resistant coating materials are supplied to a building site in an attempt to minimize the amount of field coating operation (this method is generally termed "precoat method"). However, conventional fire-resistant coating materials have not been satisfactorily suited to this method.

For example, rock wool or other spray coating materials produce coats which can not withstand, owing to low adhesion, being jolted during transport and assembly operation, thus giving rise to peeling and separation. During operation, the operator can not stand on the coated steel members because of low strength. Further these coating materials can not be used in rain since the coat separates on exposure to rain.

In addition to low adhesion, cement concrete type materials suffer the problem of making inconvenient the transportation and the lifting of coated steel members owing to extremely heavy weight per unit area.

Dry boards, such as boards of calcium silicate are susceptible to damage by rainfall, tending to significantly diminish the strength the board on wetting with water, and may require replacement of a partially broken board with a new board, involving time-consuming labor.

The refractory coating compositions of the invention are intended to find applications also in the precoat method to which known refractory coating materials have not previously been suitable.

MEANS FOR SOLVING THE PROBLEMS

The present inventor has made various investigations to provide refractory coating materials with improved fire resistance. For example, the inventor proposed, in Japanese patent application No. 199118/1984, the preparation of a refractory composition with high fire resistance comprising specific amounts of a lightweight cement aggregate and a substance having a high degree of hydration.

Conducting further research, the inventor developed a highly refractory composition capable of forming coats with great adhesion, high weatherability, lightweight properties and amenability to small thickness.

The term "lightweight" used herein refers to a bulk density of 1.0 or less, and the term "thin coat" to a coat which is 20 mm or less in terms of the thickness required for a steel beam to achieve 1-hour fire resistance according to the published notification of the Ministry of Construction.

The inventor has confirmed that a composition capable of forming a refractory coating improved in fire resistance and outstanding in adhesion and weatherability can be prepared by adding, to a mixture of a hydraulic cement and a re-emulsion type powdery resin, specific amounts of a powdery aluminum hydroxide, a carbonate substance decomposable at 300° to 1000° C. and a lightweight aggregate having open cells at a ratio of at least 50%.

This refractory coating material can reduce the weight load to be supported by a steel frame structure and can be applied thinner. Further because of high adhesion a steel frame, the coat formed from this coating material is unlikely to peel or separate and is consequently high in durability and weatherability. The coating material, if colored white, can produce coats having aesthetic properties in themselves and also decorative finishing properties of providing a coating surface with a colored finish, for example, when applied by a flat paint of inorganic polymer or the like. Such material is unknown.

According to the invention, the components of the composition are all supplied in granular form and can be provided for use by being merely mixed by dry blending, packed in a bag, transported to the construction site and kneaded with water. This feature not only affords an advantage of high work efficiency but can obviate the problem of unstable properties of composition due to uneven mixing of components on a building site, the problem being frequently attendant on compositions of field mix-type such as 2-pot or 3-pot type. An additional advantage is given if the coating material is supplied in a bag made of, e.g., moisture-proof paper with which waste materials can be conveniently disposed of.

When the refractory composition is applied to steel members in the form of a mass prepared by mixing and kneading the components with water, the refractory composition, because of its particularly high adhesion, can be applied to a steel member, for example, before transport to a building site. In that case, some in-situ coating procedures can be saved, except application of the composition to, e.g., joints between steel members, connections therebetween and broken portions, whereby the term of works on a building site can be significantly shortened.

When the refractory composition of the invention is used conjointly with sheet materials, further improvements can be achieved in terms of properties including the property of protecting the coating surface, aesthetic properties and durability. The refractory composition of the invention, which is self-curable and self-adhesive, can eliminate the need to use a specific adhesive when the cured sheet materials are affixed to the surface to be coated.

The presence of such sheet materials on the coating surface in the aforesaid precoat method is greatly advantageous in protecting the coating surface and preventing the separation of coat.

The formation of rust on the interior of steel members can be inhibited for a prolonged period of time by applying gas-impervious sheet materials, among said examples of sheet materials, to the coating surface and incorporating a volatile corrosion inhibitor into the refractory composition. While a corrosion resistant paint in general is frequently applied to steel members, this method permits refractory coating directly over steel members, consequently simplifying the coating process.

Optionally, dry boards may be arranged with a predetermined space between the surface of a steel member and the boards. In this method, the refractory composition of the invention is placed into the space and cured to integrally unite the boards and the steel member, whereby the steel member is covered with a refractory coat which is firm and outstanding in surface smoothness.

The refractory composition of the invention is not only used for application to steel frame but is effectively usable as a material, in a wet troweling method, for priming a lightweight steel member In this method, boards or laths are adhered to light gauge steel studs held erect and then the refractory coating composition is applied to the surface of boards or laths by spraying or with a trowel. The refractory composition of the invention as kneaded with water exhibits high adhesion to the substrate and high strength so that the coat formed from the composition can retain the strength required of walls. The refractory composition of the invention, capable of forming a coat with great surface strength and surface smoothness, permits application of a paint or pasting of wall paper sheets both directly to the coating surface, hence is excellent in aesthetic properties. Moreover, because of the applicability of thin coat and lightweight properties, the refractory composition of the invention has various advantages of, e.g. reducing the weight of the wall and markedly mitigating the weight load to be supported by floors

DISCLOSURE OF THE INVENTION

Figure 1:
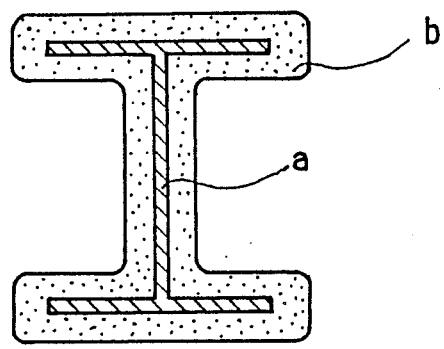
FIGS. 1 and 2 schematically show methods in which the refractory composition of the invention is applied to a steel member and sheet materials are applied to the coating surface before the coat is cured.

Examples of hydraulic cements useful in the invention include those generally known such as portland cement, alumina cement, cement as mixed with lime, blast furnace cement, silica cement, fly ash cement, masonry cement, high-sulphate slag cement, etc. These cements impart strength to refractory coating materials.

The term "re-emulsion type powdery resin" is used herein to include a powdery or granular resin prepared by drying the emulsion of a synthetic resin, obtained by emulsion polymerization, and a powdery or granular resin prepared by drying the emulsion of a synthetic resin obtained by post-emulsion. These resins can be easily emulsified with water. Usually an emulsion of vinyl type synthetic resins is made into this form. Typical examples thereof are an ester of acrylic acid, ester of versatic acid, styrene, vinyl chloride, vinyl acetate, etc. among which ethylene-vinyl acetate type and vinyl acetate-vinyl versatate type are most preferred in view of high miscibility with hydraulic cement, coating efficiency in actual application cf refractory material or ease of availability as an industrial product. While the particle size of the granule to be used is not specifically limited, usually -60-mesh granules are used.

The re-emulsion type powdery resin according to the invention affords various advantages of, e.g., preventing the lightweight aggregate from being strewn during coating operation, enhancing the coating efficiency, increasing the adhesion, precluding peeling of the coat on exposure to heat of relatively low temperature and retaining the finish stability of decorative finishing material for a long term.

The term "aluminum hydroxide" used herein is intended to denote a substance represented by the chemical formula $Al_2O_3 \cdot xH_2O$. The value x, of hydration degree, varies with the circumstances of occurrence or producing process. Among useful aluminum hydroxides are natural minerals such as boehmite, gibbsite, diaspore and the like, etc. Also usable is synthetic aluminum hydoxide prepared, e.g., by the Bayer process. It is preferred to use aluminum hydroxide having a high hydration degree such as gibbsite. The particle size of the aluminum hydroxide particles is not limited specifically, although its typically up to 1 mm. Usually used are aluminum hydroxide particles of 0.3 mm or less particle size.

Specific examples of carbonate materials decomposable at 300° to 1000° C. are heavy calcium carbonate obtained from natural minerals such as lime stone, calcite, marble or the like, industrially synthesized light calcium carbonate, magnesite, siderite, rhodochrosite, dolomite or the like among which heavy calcium carbonate is advantageously inexpensive and easily available. The desired particle size thereof is not specifically limited if in the range of up to 1 mm.

The ratio of aluminum hydroxide powder to carbonate material must be 15-85:85-15, preferably 20-80:80-20 in 100 parts by weight of a mixture of aluminum hydroxide powder and carbonate material. If aluminum hydroxide powder or carbonate material is used singly, it is impossible to achieve the object of the invention of forming a lightweight, thin, fully fire resistant coat. The object of the invention can be accomplished only when using the aluminum hydroxide powder and carbonate material in the above-specified ratio. The combined weight of aluminum hydroxide powder and carbonate material must be 50 to 600 parts by weight per 100 parts by weight of a hydraulic cement. If less than 50 parts by weight thereof is used, the contemplated fire resistance can not be afforded. If more than 600 parts by weight thereof is used, the hydraulic cement and re-emulsion type powdery resin serving as binders account for relatively smaller proportions of the composition, and the composition is imparted reduced strength, becoming unsuitable for practical use.

The lightweight aggregate having open cells at a ratio of 50% or more used as the characteristic component according to the present invention is intended to include those prepared by foaming or expanding natural mineral or synthetic material and having a particle density of 1.2 kg/l or less. The particle size of the aggregate particles is not specifically limited but, desirably about 10 mm or less in view of the use of spray coating in which this range is sufficient to prevent clogging in the spray nozzle. Specific examples of useful lightweight aggregates are expanded perlite, expanded shale, expanded vermiculite, pumice, foamed silica gel, granulated or foamed clay and the like in which at least 50% of the total cells are open cells. Preferred lightweight aggregates are those having a great number of open cells and a small bulk specific gravity (particle bulk density of 0.3 kg/l or less), such as expanded perlite and expanded vermiculite. Also usable is an aggregate produced from closed cell aggregate by shattering or crushing and having open cells at an apparent ratio of at least 50%.

The amount of lightweight aggregate having open cells at a ratio of 50% or more is 20 to 300 parts by weight per 100 parts by weight of a hydraulic cement. Less than 20 parts by weight of aggregate used fails to provide a coat with lightweight properties which is included in the object of the invention. When more than 300 parts by weight thereof are used, the mechanical strength of resulting coat is diminished and leads to peeling and breaking due to poor adhesion, low surface strength or the like, and hence is undesirable.

In addition to the five components described above, the composition of the invention may contain, when required, extenders, such as powders of refractory clay, refractory oxides, quartz sand or lime; fibrous materials serving to prevent cracks from developing in the cured coat such as glass fibers, rock wool or pulp fibers; cellulose-type water-soluble resin powders as viscosity modifiers; surfactants as fluidity modifiers; pigments as coloring agents; or the like, all in a suitable amount which will not result in impairment of the fire resistance nor in reduction of the mechanical strength or adhesion of the coating.

In use, the composition of the invention, comprising the foregoing components, is mixed with water and kneaded. The amount of water can be varied with the proportions of the components, the method used and other factors, but usually is about 60 to about 180 parts by weight per 100 parts by weight of the composition of the invention. In a concrete-placing method which requires a composition of high fluidity, water is added in an amount larger by 5 to 20% by weight than in the troweling method or spraying method. The kneaded mass is pumped up through a hose and is forced out dispersed in air from the head of a spray nozzle to form a coat of specific thickness. Optionally troweling may be carried out. Generally these operations are conducted on a building site after assembling of steel members. Thereafter the composition thus applied is cured and dried, giving a refractory coat.

Substantially the same coating methods as above are employable in the precoat method intended to shorten the term of works on a building site which method obviates the need for in-situ spray application by transporting steel members, spray-covered with a refractory coating material at a steel working factory or elsewhere, directly to a building site. In this case, sheets of polyethylene or the like are used, of course, to cover the portions which should not be coated at this stage, such as the joints of steel members and connections in the deck. The application of coating material to the required portions is performed as repair work on the building site after assembling of steel members.

A method using sheet materials is very useful in protecting the surface more securely and giving aesthetic properties to the surface. This method is classified into the following two methods.

A first method comprises adhering the sheet materials, by pressing, to an uncured coat formed from the kneaded mass of the invention over a steel member as shown in FIG. 1. Care should be taken to affix the sheet materials to the coat while it remains soft. The sheet materials can not be fixed to a coat which has nearly cured. In this case, the sheet materials, even if seemingly held to the coat, actually keep feeble hold thereto with poor adhesion, involving the risk of separating later. It is desirable to adhere the sheet materials to the coat usually within about 1 hour after application of the composition, although this time depends on the proportions of the components.

Figure 2:
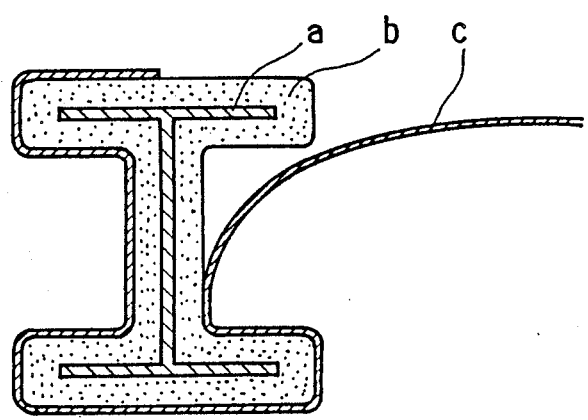
Figure 3:
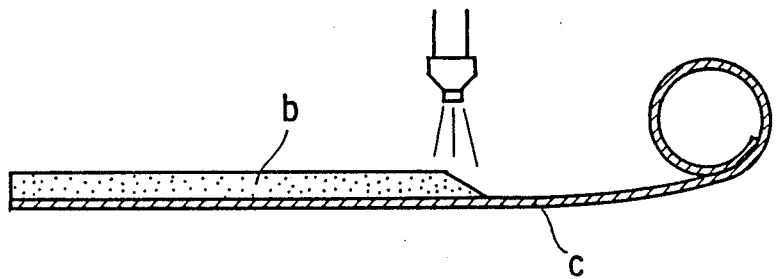
FIGS. 3, 4 and 5 schematically show methods in which the refractory composition of the invention is applied to sheet materials and the coated sheet materials are adhered to the surface of a steel member before the coat is cured.
Figure 4:
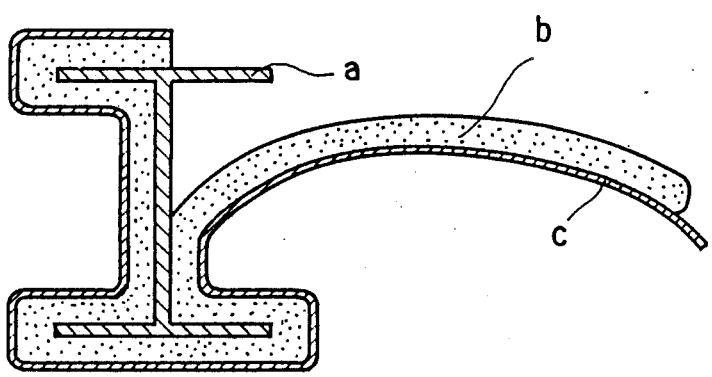

A second method, as shown in FIG. 2, comprises applying the kneaded mass onto sheet materials providing a top surface to a specific thickness sufficient to meet the fire resistance requirement, pressing the coated sheet materials, before curing, to the steel member with the coating surface directed to the steel member for integral union and curing the coat at ambient temperature. Such method can be used because the refractory coating composition of the invention is highly adhesive as mixed with water. Unlike the method spraying over a steel member of complicated shape, this method has the advantages of making thickness control easy because of coating on the smooth surface of sheet materials and reducing the loss of composition arising from scattering.

The term "sheet material" used herein is intended to include inorganic materials such as cloths, nonwoven fabrics or nets of glass fibers, ceramic fibers, carbon fibers or metallic fibers, metallic foils of aluminum, iron or stainless steel and organic materials such as paper sheets, films or sheets of polyvinyl chloride, polystyrene, polypropyrene or polyvinylidene chloride, fabrics or nonwoven fabrics of nylon, polyester or like synthetic fibers, cotton, flax, wool, silk or like natural fibers, etc.

Also usable are combinations of these materials, laminates thereof and the like such as cloth strips of polyvinyl chloride lined with paper sheets. In preference to films or like smooth-surfaced sheet materials, nettings, fabrics or nonwoven fabrics are preferably used because the latter have more uneven surface and can achieve more intimate engagement with the layer of refractory coating material, producing a securer union. Since the refractory coating composition per se is fully satisfactory in fire resistance, useful sheet materials for providing a surface can be any of organic and inorganic materials among which incombustible or flame resistant materials are rather preferable.

Figure 5:
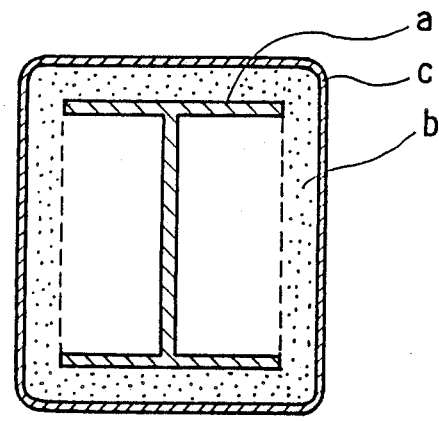

The method using sheet materials may provide a structure, for example, as shown in FIG. 5, with a space defined by the surrounding layer of refractory coating composition. In this case, the surface of the steel member facing the space is in contact, not with the layer of alkaline composition, but with a highly humid atmosphere and is accordingly more prone to corrosion than the surface of steel member in intimate contact with a layer of alkaline composition.

To overcome this problem, a method can be practiced using gas-impervious sheet materials as selected from the above-exemplified materials in combination with a volatile corrosion inhibitor.

Examples of gas-impervious sheet materials are wax paper sheets, polyvinyl chloride films, polyethylene films, aluminum foils and the like which are at least 100 $m^2 \cdot hr \cdot mmHg/g$ in resistance to moisture penetration. These materials can be used singly or in laminated form.

The term "volatile corrosion inhibitor" used herein refers to agents volatile at ambient temperature and capable of inhibiting the corrosion of metals. Volatile corrosion inhibitors effective against iron corrosion include, for example, nitrites, chromates or carbonates of amines, esters of carboxylic acids, mixtures thereof, etc.

Specific examples of these inhibitors are dicyclohexyl ammonium nitrite (DICHAN), dicyclohexylammonium caprylate, cyclohexylammonium carbonate (CHC), cyclohexylammonium laurate, diisopropylammonium nitrite (DIPAN), nitronaphthalinammonium nitrite (NI- TAN), a mixture of DICHAN (80%) and DIPAN (20%), mixture of monooctanolamine benzoate, urea and sodium nitrite, dicyandiamidine nitrite, morpholine laurate, etc. These inhibitors are all suitable to achieve the object of the invention. Particularly, for long-term protection, the DICHAN type having a low vapor pressure is more preferable. In use, the inhibitor is added in the form of powder or aqueous solution to the composition of the invention. A preferred amount of inhibitor is 0.05 to 5.0 parts by weight per 100 parts by weight of refractory coating composition as solids. Less than 0.05 part by weight of inhibitor is unlikely to produce a long-term anticorrosive effect, whereas more than the above range is disadvantageous in costs and unable to increase the effect.

Figure 6:
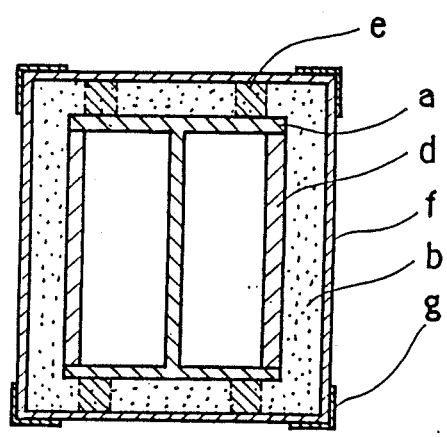
FIG. 6 schematically shows a method in which boards are set around a steel member to form a space between the board and the steel member and the refractory composition of the invention is placed into the space.

Also employable is a refractory coating method which gives a structure as shown in FIG. 6. In this structure, panels f are arranged around a steel member a to provide a specific space therebetween, and the refractory composition of the invention b is placed into the space.

First, backers d are adhered to the steel member a. When the steel member a is not of wide-flange section but of square tubular section, the backers d, of course, need not be used. Then spacers e are affixed with an adhesive to the surface of the steel member a with specific spacing therebetween. The thickness of coat to be formed can be determined by the spacers e. The panels f are joined to the spacers e with the adhesive to form an enclosure the four corners of which are fixed with corner beads g. The kneaded mass of refractory composition is placed into the space by a concrete-placing method or the like and left to stand for curing.

Useful materials for the backers d include an extensive range of materials conventionally used such as wire nettings, gypsum boards, asbestos cement slates, cemented excelsior boards, pulp cement flat boards, hard boards, etc. The size of the backers d is suitably determined according to the wide-flange section steel member. The adhesive is not specifically limited and can be any of organic and inorganic adhesives, examples of the former being epoxy resins and examples of the latter being water-glass type and phosphate type adhesives. The spacers e serve as supports for forming a space between the steel member a and the panels f, and are preferably those made of inorganic, relatively fire resistant heat-insulating materials such as calcium silicate boards, lightweight foamed concrete boards, mortar boards, gypsum boards, etc. The spacers to be used measure usually about 20 mm×about 20 mm, and their thickness is varied according to the thickness of refractory composition layer, e.g., about 10 to about 40 mm.

The panels f not only serve as a formwork to be filled with the refractory coating composition but provide a finish surface on the coat. Panel materials are properly selected and used according to the coat thickness. For example, if the refractory coating material can produce a coat having a thickness sufficient to fully meet the fire resistance requirement, the panel material can be adequately selected from a wide range of materials without consideration of the fire resistance of the material. Examples thereof are gypsum boards, asbestos cement slates, cemented excelsior boards, pulp cement flat boards, plywoods, particle boards, hard boards, etc.

Corner beads g are used to cover and reinforce the corners at the butt joint of panels f and are preferably made of stainless steel, aluminum or the like.

Of course, this method can also use a volatile corrosion inhibitor, as in the method employing sheet materials.

RESULTS OF THE INVENTION

This invention can achieve the following results.

(1) The components of the composition according to the invention are all supplied in granular form and in a single package and can be used by merely being mixed with water, thereby serving to remarkably improve the working efficiency.

(2) In the case of spraying, the composition of the invention as kneaded with water is sprayed and is unlikely to throw dust and to stain the working atmosphere.

(3) The coat formed from the composition of the invention is lightweight and can exhibit sufficient fire resistance, even if it has a small thickness, consequently leading to a reduction in the weight per unit area and to a decrease in the weight load to be supported by the building structure.

(4) A thinner coat can be formed than when using conventional refractory coating compositions, and thus makes it possible to increase the effective size of the interior of rooms so surrounded.

(5) The coat formed is outstanding in water resistance and weatherability and can not peel off on exposure to wind and rain.

(6) While asbestos, rock wool or like fibrous refractory coating materials give a coat with a surface of fibrous texture which is easily contaminated, the coat from the composition of the invention is fine-textured in surface, hence it is less susceptible to contamination.

(7) Even if stained, the formed coat can be washed with water unlike the fibrous refractory coating materials and thus can retain its aesthetic properties all the time.

(8) The composition of the invention can be applied in white color and gives a coat with a pleasingly white finish surface. Further, when required, a colored coat can be produced by adding a pigment or the like.

(9) The use of a lightweight aggregate having numerous open cells results in the formation of a coat which is outstanding in water absorption and moisture absorption and capable of preventing dew condensation.

(10) Since the composition of the invention kneaded with water produces a coat which is excellent in adhesion and which when cured is lightweight and great in strength, a precoat method is feasible in which steel members which have been spraycovered with a refractory coating material off-site are assembled on a building site to shorten the term of works on the site to a great extent.

The method using sheet materials for covering the coat gives the following results.

(11) Affixing the sheet materials to the coating surface assures more secure protection the coating surface, consequently making it unlikely for the coating surface to break or separate due to impact.

(12) When using sheet materials having printed patterns, a coat having remarkable aesthetic properties can be obtained by a simplified procedure.

(13) When a method is effected in which sheet materials are coated with a refractory coating material and the coated sheet materials are each adhered to a steel member, a smaller loss of coating material due to scattering than in spraying over a steel member of complicated shape is assured.

(14) When a gas-impervious material is selected as a surface sheet and is used conjointly with a volatile corrosion inhibitor, this results in long-term inhibition of corrosion without the need to apply a corrosion resistant coating material to the surface of a steel member.

(15) The method of using panels can produce a structure in which the steel members, panels and refractory coating composition are intimately and integrally united with each other to impart enhanced strength.

(16) With a smooth surface and a dimensionally accurate thickness, the coat formed is remarkable in aesthetic properties and homogeneous in fire resistance.

EXAMPLES

The invention will be described below in more detail with reference to the following Examples and Comparison Examples.

A. COMPARISON OF PROPERTIES OF COMPOSITIONS (1) Method for producing specimens Powdery components were each weighed and mixed together by dry kneading in a mortar mixer into uniformly mixed powders. Water was added to the mixture in an amount suitable for spraying or troweling and the mixture was kneaded in a mortar mixer to give a pasty mixture. The paste was partly placed into a mold (40 mm×40 mm×160 mm) as defined in JIS R 5201 to determine the bulk density and the compressive strength thereof, and cured in a curing chamber at a temperature of 20° C. and at a humidity of 65% for 2 days. Thereafter the mass was withdrawn from the mold and cured again in the same manner as above for 26 days (cured for 28 days in total), giving a specimen.

Specimens, to be used for fire resistance test, were each prepared by applying a refractory coating material to a wide-flange section steel member measuring 300 mm×300 mm ×9 mm×14 mm×300 mm (length) in each of six different thicknesses (10, 15, 20, 25, 30 and 35 mm) and curing the coat at a temperature of 20° C. and at a humidity of 65% for 28 days. Specimens for adhesion test were prepared by applying the refractory coating material to a hot rolled steel plate (75 mm×150 mm×3 mm) to a thickness of 10 mm and curing the coat in the same manner as above.

(2) Bulk density

Using the specimen for bulk density test obtained above by curing under the above conditions, the size of the specimen exterior was measured by calipers to find a volume (V), and a weight (W) measurement was taken. The bulk density was calculated by the following equation:

$$\text{Bulk density} = \frac{\text{Weight } (W)}{\text{Volume } (V)} \ (g/cm^3)$$

(3) Compressive strength

The specimen prepared above in (1) was made into a panel measuring 40 mm×40 mm. Pressure was applied to the specimen at a rate of 1 to 2 kg/sec as a rule. The compressive strength was calculated by the following equation on the basis of the maximum load when the specimen has been broken:

$$\text{Compressive strength } (C) = \frac{\text{Maximum load } (P)}{16} \ (kgf/cm^2)$$

(4) Coat thickness corresponding to 1-hour fire resistance of column

The test was conducted as follows.

Figure 7:
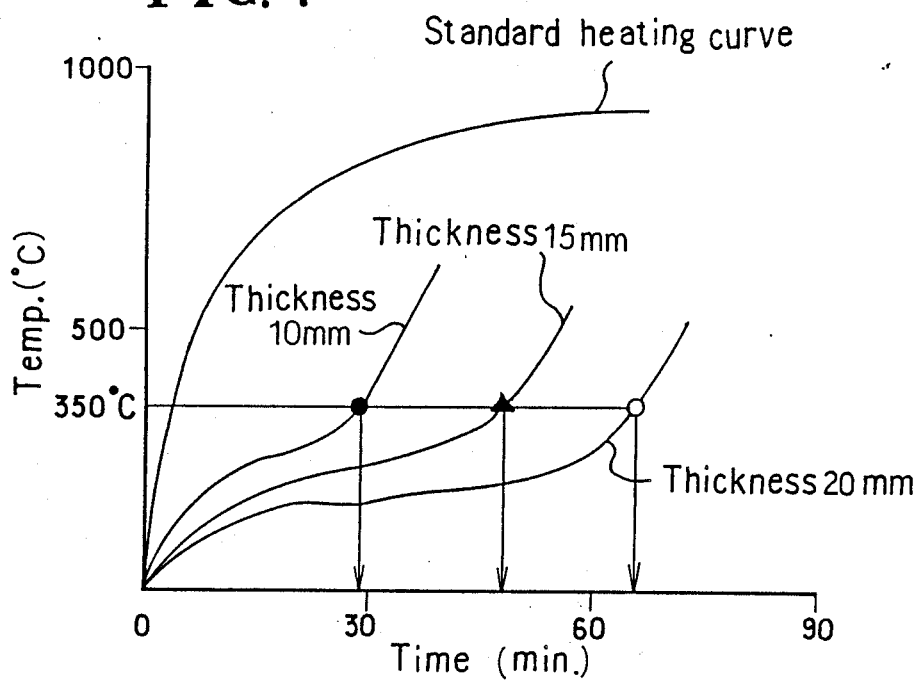
FIG. 7 is a curve showing the elevation of temperature of steel member in determining the coat thickness corresponding to 1-hour fire resistance of steel column.

The specimen prepared above in (1) was set in a furnace using propane gas and heated according to the standard heating curve in JIS A 1304. The elevation of temperature, shown as a curve, of the steel member was determined with a thermocouple (chromel-alumel thermocouple) embedded in a bore of the steel member in respect of specimens with varied thicknesses. Also determined was the heating time (min) that it took until the steel member reached a temperature of 350° C., which is the acceptable standard in the fire resistance test. FIG. 7 shows the results.

Figure 8:
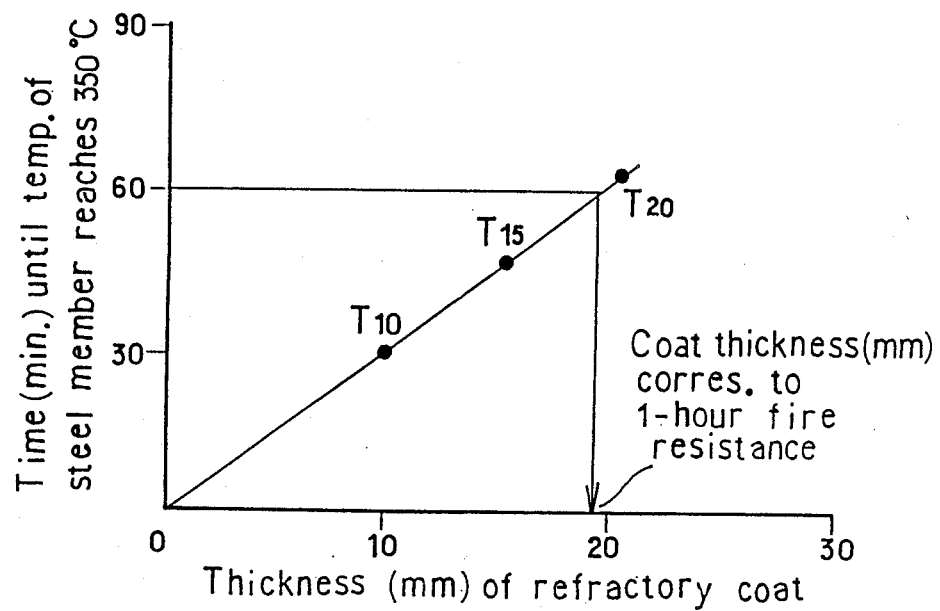
FIG. 8 shows the relationship between the thickness (mm) of refractory coat and the time (min) taken until the temperature of steel member reaches 350° C. in respect of the method in FIG. 3.

Plotting the coat thickness (mm) as abscissa and the time (min) for the steel member to reach 350° C. as ordinate, the measurements were indicated one by one as points which were then connected into a line. The coat thickness corresponding to 1-hour (60 minute-) fire resistance of a column was obtained according to the line, which is shown in FIG. 8.

(5) Required weight per unit area

The required weight per unit area was calculated in accordance with the following equation in which M is the coat thickness (mm) corresponding to 1-hour fire resistance and C is the bulk specific gravity:

$$C \times M \ (mm) \times (1/10) \times (100 \times 100) \times (1/1000) \ (kg/m^2)$$

(6) Adhesion

A square support (40 mm×40 mm) was adhered with epoxy resin to the surface of specimen and subjected together to a tensile test at a loading rate of 150 to 200 kgf/min to determine the maximum load which produced a fracture. The adhesion was calculated by the following equation:

$$\text{Adhesion } (F) = \frac{\text{Maximum load } (P)}{16} \ (kgf/cm^2)$$

Table 1 shows the components used in Examples to follow, and Table 2 the amounts thereof and the properties of the specimens in the Examples, and Tables 3 and 4 those in Comparison Examples.

EXAMPLES 1

The properties of a specimen prepared from the composition shown in Table 2 were determined. The specimen was found to be a highly fire resistant coating composition capable of forming a coat which was as thin as 16 mm in terms of the thickness corresponding to 1-hour fire resistance, as lightweight as 12.8 kg/m² in the weight per unit area and as high as 2.2 kgf/cm² in adhesion.

EXAMPLE 2

A refractory coating composition as excellent as that of Example 1 was produced from the same components as used in Example 1 with the exception of using expanded vermiculite in place of the open-cell expanded perlite.

EXAMPLE 3

A refractory coating composition was prepared using a resin powder in a larger amount of 30 parts, and aluminum hydroxide and calcium carbonate in reduced amounts.

EXAMPLE 4

A refractory composition was prepared using magnesium carbonate in place of the calcium carbonate.

EXAMPLE 5

A resin powder was used in an increased amount of 40 parts, and a mixture of expanded vermiculite and open-cell expanded perlite was used.

The refractory coating compositions prepared in Examples 3, 4 and 5 were all excellent in properties and suitable to achieve the object of the invention.

COMPARISON EXAMPLE 1

A refractory coating composition was prepared from the same components as used in Example 1 with the exception of not using the lightweight aggregate. The coat formed from this composition was as thin as 18 mm in terms of the thickness corresponding to the 1-hour fire resistance, but involved a great load to be supported by the structure in view of its high density and heavy weight of 28.8 kg/m$^2$ per unit area.

COMPARISON EXAMPLE 2

A refractory coating composition was prepared from the same components as used in Example 1 with the exception of using closed cell expanded perlite as lightweight aggregate. The coat formed from the composition was not great in respect of the thickness corresponding to 1-hour fire resistance.

COMPARISON EXAMPLE 3

A refractory coating composition was prepared using aluminum hydroxide without use of carbonate material, and gave a coat similarly great in terms of the thickness corresponding to the 1-hour fire resistance.

COMPARATIVE EXAMPLE 4

A refractory coating composition was prepared using calcium carbonate but without aluminum hydroxide, and gave a coat also great in terms of the thickness corresponding to the 1-hour fire resistance as in Comparison Example 3.

The refractory coating compositions in Comparison Examples 1, 2, 3 and 4 were all heavier in the weight per unit area than those of the Examples.

COMPARATIVE EXAMPLES 5 and 6

These examples show the use of aluminum hydroxide and calcium carbonate in widely different amounts. The resulting coats were not so small in terms of the above thickness.

COMPARATIVE EXAMPLE 7

The composition prepared without resin powder gave a coat with an extremely reduced adhesion.

COMPARATIVE EXAMPLE 8

The composition prepared using an excess amount of resin powder formed a coat having a diminished fire resistance and great in the required thickness. Smoke was given off to a slight extent by application of heat.

COMPARATIVE EXAMPLES 9 AND 10

For comparison, rock wool and cement mortar were each used. The rock wool-containing composition produced a coat greatest in the required fire resistance and the cement mortar-containing composition was the heaviest in the weight per unit area.

Figure 9:
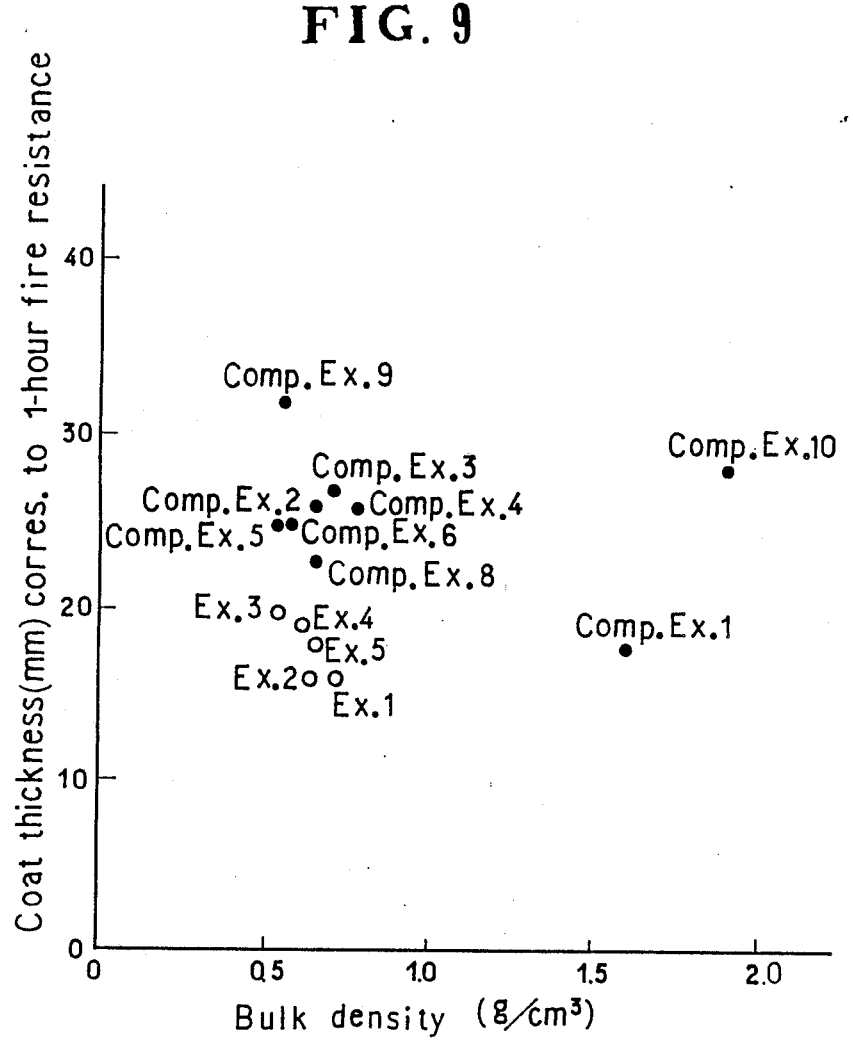

FIG. 9 is a graph showing the relationship between the bulk density (g/cm$^2$) and the thickness (mm) corresponding to 1-hour fire resistance plotted therein.

B. METHOD USING SHEET MATERIALS

EXAMPLE 6

The same composition as used in Example 1 was kneaded with water in a mortar mixer. The resulting mass was sprayed, with the use of a mortar pump, over wide-flange section steel member measuring 200 mm×400 mm×7 mm×10 mm×3 m (length) to an average thickness or 16 mm. Immediately thereafter, a piece of nonwoven fabric of glass fiber, with a mass of 300 g/m$^2$ having glass chopped strands, bonded to a 1.5 m length of the piece with epoxy resin was adhered by pressing, directly to the uncured coat, and the coat was cured for 2 weeks, whereby a coated steel member having 1-hour fire resistance was produced. The coated steel member was loaded onto a truck and carried away over a distance of about 50 km to check the peeling of the coat. The test revealed no release of coat.

An iron ball weighing 5 kg was dropped onto the surface of the coated steel member from a height of 1 m with the result that a coat portion covered with the nonwoven fabric of glass fiber was indented whereas an uncovered coat portion was not only indented but also partly chipped and dropped off.

EXAMPLE 7

The same composition as in Example 1 was kneaded with water in a mortar mixer and spread wit a trowel over a piece of glass cloth having a mass of 200 g/m$^2$ and a thickness of about 0.18 mm to form a coat of 16 mm thickness. Thereupon the coated glass cloth piece was hand pressed and adhered onto the surface of a steel member identical in size with that used in Example 6, and the coat was cured spontaneously. The steel member covered with the glass cloth was found to have remarkable aesthetic properties and 1-hour fire resistance.

The glass cloth-covered steel member was subjected to the same peel test and impact test as in Example 6, and was found to involve no release of the coating surface nor peeling on the surface of steel member.

C. METHOD USING A VOLATILE CORROSION INHIBITOR

EXAMPLE 8

A refractory coating composition containing 0.5 part of DICHAN per 100 parts of the same components as used in Example 1 was sprayed in the same manner as in Example 6 over the entire circumferential surface of 1.5 m length of a steel member dimensionally identical with that used in Example 6. Onto the coat was immediately pressed and adhered a 0.5 mm-thick sheet of polyvinyl chloride laminated on its underside with a glass cloth piece to cover the entire coating surface therewith. A refractory coating composition free of DICHAN was applied onto the surface of remaining 1.5 m length thereof and the entire surface of the coat was covered with the same sheet as above. These two specimens were left to stand outdoor for one year and the coats of refractory coating compositions were peeled off. The peel test showed that corrosion developed over approximately ½ the area of the steel member surface coated with the DICHAN-free refractory coating composition, whereas no corrosion was detected on the surface coated with the DICHAN-containing refractory coating composition.

TABLE 1.

| No. | Name of Material | Remarks | |
|---|---|---|---|
| A-1 | Portland cement | JIS R 5210 | |
| B-1 | Ethylene-vinyl acetate copolymer powder | Hoechst Synthesis K.K. Particle size | Movinyl DM 200 −60 mesh |
| C-1 | Aluminum hydroxide | Particle size | −100 mesh |
| D-1 | Calcium carbonate | Particle size | −200 mesh |
| D-2 | Magnesium carbonate | Particle size | −200 mesh |
| E-1 | Expanded vermiculite | Specific gravity Particle size Open-cell ratio | 0.14 0.15–2.5 mm about 60% |
| E-2 | Expanded perlite | Specific gravity Particle size Open-cell ratio | 0.10 0.5–2 mm about 80% |
| E-3 | Expanded perlite (Obsidian type) | Specific gravity Particle size Open-cell ratio | 0.20 0.5–2 mm about 10% |
| F | Glass fiber | Length | 13 mm |

TABLE 2

| | Example | | | | |
|---|---|---|---|---|---|
| | 1 | 2 | 3 | 4 | 5 |
| Components (part by weight) | | | | | |
| A-1 | 100 | 100 | 100 | 100 | 100 |
| B-1 | 10 | 10 | 30 | 30 | 40 |
| C-1 | 200 | 200 | 100 | 400 | 300 |
| D-1 | 300 | 300 | 200 | 0 | 0 |
| D-2 | 0 | 0 | 0 | 100 | 100 |
| E-1 | 70 | 0 | 0 | 0 | 50 |
| E-2 | 0 | 150 | 150 | 50 | 50 |
| E-3 | 0 | 0 | 0 | 0 | 0 |
| F | 3 | 3 | 3 | 3 | 5 |
| Performance Test Results | | | | | |
| Compressive strength (kgf/cm$^2$) | 33 | 21 | 18 | 51 | 31 |
| Bulk density (after 28 days) | 0.71 | 0.63 | 0.51 | 0.67 | 0.61 |
| Thickness (mm) corres. to 1 hour's fire resistance of column | 16 | 16 | 20 | 18 | 19 |
| Weight (kg/m$^2$) per unit area in 1 hour's fire resistance of column | 12.8 | 10.1 | 10.2 | 12.0 | 11.6 |
| Adhesion (kgf/cm$^2$) | 2.2 | 2.0 | 3.6 | 4.4 | 5.2 |

TABLE 3

| | Comparison Example | | | | | | | | *9 | *10 |
|---|---|---|---|---|---|---|---|---|---|---|
| | 1 | 2 | 3 | 4 | 5 | 6 | 7 | 8 | | |
| Components (part by weight) | | | | | | | | | | |
| A-1 | 100 | 100 | 100 | 100 | 100 | 100 | 100 | 100 | | |
| B-1 | 10 | 10 | 10 | 10 | 30 | 30 | 0 | 60 | | |
| C-1 | 200 | 200 | 500 | 0 | 270 | 30 | 200 | 200 | | |
| D-1 | 300 | 300 | 0 | 500 | 30 | 270 | 300 | 300 | Rock wool type | Mortar type |
| D-2 | 0 | 0 | 0 | 0 | 0 | 0 | 0 | 0 | | |
| E-1 | 0 | 0 | 70 | 70 | 0 | 0 | 70 | 70 | | |
| E-2 | 0 | 0 | 0 | 0 | 150 | 150 | 0 | 0 | | |
| E-3 | 0 | 100 | 0 | 0 | 0 | 0 | 0 | 0 | | |
| F | 3 | 3 | 3 | 3 | 3 | 3 | 3 | 3 | | |
| Performance Test Results | | | | | | | | | | |
| Compressive strength (kgf/cm$^2$) | 110 | 52 | 30 | 37 | 18 | 25 | 27 | 40 | 4 | 210 |
| Bulk density (after 28 days) | 1.60 | 0.67 | 0.69 | 0.77 | 0.53 | 0.55 | 0.73 | 0.66 | 0.53 | 1.87 |
| Thickness (mm) corres. to 1 hour's fire resistance of column | 18 | 26 | 27 | 26 | 25 | 25 | 16 | 23 | 32 | 28 |
| Weight (kg/m$^2$) per unit area in 1 hour's fire resistance of column | 28.8 | 17.4 | 18.6 | 20.0 | 13.3 | 13.8 | 11.7 | 14.5 | 17.0 | 52.4 |
| Adhesion (kgf/cm$^2$) | 2.6 | 2.0 | 2.2 | 2.4 | 3.6 | 4.0 | 0.3 | 6.0 | 0.0 | 0.0 |

*The amounts of components in Comparison Examples 9 and 10 are shown in Table 4.

TABLE 4

| | Comparison Example | |
|---|---|---|
| | 9 | 10 |
| Portland cement | 30 | 20 |
| Expanded vermiculite | 25 | — |
| Rock wool | 70 | — |
| River sand | — | 60 |

What is claimed is:

1. A refractory coating composition consisting essentially of:
   (i) 100 parts by weight of portland cement,
   (ii) 3 to 50 parts by weight of a powdered re-emulsion resin,
   (iii) 50 to 6000 parts by weight of a mixture of 15 to 85% by weight of aluminum hydroxide powder and 85 to 15% by weight of a carbonate decomposable at a temperature of 300° and 1000° C, and
   (iv) 20 to 300 parts by weight of a lightweight aggregate having at least 50% open cells based on the total cells.

2. A refractory coating composition according to claim 1, wherein the re-emulsion resin is a vinyl resin powder.

3. A refractory coating composition according to claim 2, wherein the re-emulsion resin is a powder comprising at least one of an ethylene-vinyl acetate copolymer and a vinyl acetate-vinyl versatate copolymer.

4. A refractory coating composition according to claim 1, wherein the weight ratio of said aluminum hydroxide powder and said carbonate is 20–80:80–20.

5. A refractory coating composition according to claim 1, wherein the lightweight aggregate is at least one of expanded perlite and expanded vermiculite.

* * * * *